(12) United States Patent
Sato et al.

(10) Patent No.: US 7,868,565 B2
(45) Date of Patent: Jan. 11, 2011

(54) LINEAR ACTUATOR MOTOR SELECTION METHOD AND DEVICES

(75) Inventors: Yoshio Sato, Rolling Meadows, IL (US); Takeshi Yoshizawa, Tokyo (JP)

(73) Assignees: Minebea Co., Ltd. (JP); Minebea Motor Manufacturing Corporation (JP)

( * ) Notice: Subject to any disclaimer, the term of this patent is extended or adjusted under 35 U.S.C. 154(b) by 386 days.

(21) Appl. No.: 12/143,726

(22) Filed: Jun. 20, 2008

(65) Prior Publication Data

US 2009/0315504 A1 Dec. 24, 2009

(51) Int. Cl.
*H02P 1/58* (2006.01)
(52) U.S. Cl. ............................ 318/102; 318/135; 318/38
(58) Field of Classification Search ................ 318/102, 318/135, 649, 687, 38; 310/12
See application file for complete search history.

(56) References Cited

U.S. PATENT DOCUMENTS

2004/0256919 A1* 12/2004 Hashimoto et al. ............ 310/12

* cited by examiner

*Primary Examiner*—Karen Masih
(74) *Attorney, Agent, or Firm*—Townsend and Townsend and Crew LLP (57) ABSTRACT

A method of selectively utilizing a set of linear actuator motors for an application includes providing a plurality of linear actuator motors numbered from 1 to N including a box shaped housing with respective lengths between a first end-plate and a second end-plate and respective hollow shafts. Each hollow shaft includes an extended portion out of either the first end-plate or the second end-plate and configured to receive a nut including a tube part integrally connected with a flat-end part. The nut is configured to be able to mate in a common manner to any of the plurality of linear actuator motors. The method further includes testing any of the plurality of linear actuator motors including the nut for the application, wherein the nut is detached from one linear actuator motor to reattach with another linear actuator motor.

20 Claims, 5 Drawing Sheets

| L/W COLOR \ STEP | 赤 RED | 青 BLU | 黄 YEL | 橙 ORG |
|---|---|---|---|---|
| 1 | + | + | − | − |
| 2 | − | + | + | − |
| 3 | − | − | + | + |
| 4 | + | − | − | + |

FIG. 5A

| L/W COLOR \ STEP | 赤 RED | 青 BLU | 黄 YEL | 橙 ORG | 黒白 BLK WHT |
|---|---|---|---|---|---|
| 1 | − | − | 0 | 0 | + |
| 2 | 0 | − | − | 0 | + |
| 3 | 0 | 0 | − | − | + |
| 4 | − | 0 | 0 | − | + |

FIG. 5B

LINEAR ACTUATOR MOTOR SELECTION METHOD AND DEVICES

BACKGROUND OF THE INVENTION

The invention is directed to application of electromagnetically actuated devices and more particularly a method and system of selectively utilizing a set of linear actuator motors for an application. Merely by way of example, the invention has been applied to techniques related to reduce tooling investment with flexible assembly means for meeting customer's equipments. But it would be recognized that the invention has a much broader range of applicability.

Rotary stepping motors are widely known and used in various technical fields. One of the common form of such a stepping motor has a toothed motor and a stator with poles constructed appropriately for certain number of steps. Stepping motors that operate in steps are commonly used in connection with digital equipment wherein pulses are applied to the stepping motor which is used as an actuator.

Linear electromagnetic actuators are also known in the art, such devices embodying linearly movable armature members having teeth which are associated with a stator having poles and windings which are energizable to cause the movable member to move in the direction of its length. Linear actuator motors combine the rotary stepping motor and the linear actuator so that the linearly movable armature member is driven by a toothed rotor coupled with the stator. An example of such linear actuator includes a lead screw interlocked by a nut disposed at certain location of a shaft.

Linear actuator motors are widely used in fields from consumer electronics products to medical instruments or custom laboratory equipments. Particularly, for medical applications and custom experimental applications, devices combining rotary and linear positioning mechanisms need to provide flexibility in terms of both functional characters and structural characters. For example, for certain application, it requires a system that offers a set of different linear actuator motors each offering different power ratings in terms of the value of torques provided. Correspondingly it is desirable to make the system flexible in terms of selectively utilizing the set of linear actuator motors economically.

However, the prior arts are lacking to meet the specific requirements mentioned above and beyond in terms of the particular constructional improvements of the invention described in detail hereinafter. For example, the nut for interlocking the linear actuator is usually built inside the motor assembly not easily accessible by customer. The nature of the improvements is brought out more clearly in the detailed description hereinafter of the preferred embodiment.

BRIEF SUMMARY OF THE INVENTION

Embodiments of the present invention are directed to applications of electromagnetically actuated devices and more particularly a method and system of selectively utilizing a set of linear actuator motors for an application. Merely by way of example, the invention has been applied to techniques related to reduce tooling investment with flexible assembly means for meeting customer's equipments. But it would be recognized that the invention has a much broader range of applicability.

In a specific embodiment, the present invention provides a method of selectively utilizing a set of linear actuator motors for an application. The method includes providing a plurality of linear actuator motors including at least a first linear actuator motor, a second linear actuator motor, and an Nth linear actuator motor, where N is an integer greater than 2. The plurality of linear actuator motors numbered from 1 to N includes a box shaped housing with respective lengths numbered from 1 to M between a first end-plate and a second end-plate and respective hollow shafts numbered from 1 to M associated with respective power ratings, where M is an integer equal to or less than N. Each of the respective hollow shafts numbered from 1 to M includes an extended portion out of either the first end-plate or the second end-plate and configured to receive a nut. The nut includes a tube part integrally connected with a flat-end part. The tube part is configured to fit inside each hollow shaft for holding a linear actuator. The flat-end part is exposed and attached with a sleeve surrounding the extended portion of each hollow shaft. In one embodiment, the nut is configured to be able to mate in a common manner to any of the plurality of linear actuator motors. Additionally, the method includes testing the first linear actuator motor including the nut for the application and determining whether the first linear actuator motor with a first power rating is suitable for the application. Moreover, the method includes detaching the nut from the first linear actuator motor if the first power rating is not suitable for the application. Furthermore, the method includes reattaching the nut with a second linear actuator motor and testing the second linear actuator motor for the application.

In another specific embodiment, the method further includes determining whether the second linear actuator motor with a second power rating is suit for the application and detaching the nut from the second linear actuator motor if the second power rating is not suit for the application. The method further includes reattaching the nut with the Nth linear actuator motor, where N is an integer greater than 2, to repeat testing until that one of the plurality of linear actuator motors is selected for the application.

In an alternative embodiment, the present invention provides a system for selectively utilizing a set of linear actuator motors for an application. The system includes a plurality of linear actuator motors numbered from 1 to N, where N is an integer equal to or greater than 2. The plurality of linear actuator motors numbered from 1 to N includes a box shaped housing with respective lengths numbered from 1 to M between a first end-plate and a second end-plate and respective hollow shafts numbered from 1 to M associated with respective power ratings, where M is an integer equal to or less than N. Each of the respective hollow shafts numbered from 1 to M includes an extended portion out of either the first end-plate or the second end-plate and configured to receive a nut. The nut includes a tube part integrally connected with a flat-end part. The tube part is configured to fit inside each hollow shaft for holding a linear actuator. The flat-end part is exposed and attached with a sleeve surrounding the extended portion of each hollow shaft. In one specific embodiment, the nut is configured to be able to mate in a common manner to any of the plurality of linear actuator motors. Additionally, the system includes a digital controller for generating digital electric pulses. Moreover, the system includes a testing device coupled to the digital controller and configured to operate the plurality of linear actuator motors one by one for generating respective linear motions by the linear actuator interlocked by the nut, wherein the nut is detachable and reusable for any of the plurality of linear actuator motors until one of the plurality of linear actuator motors is selected for the application.

Many benefits are achieved by way of the present invention over conventional techniques. For example, embodiments of the present invention provide a system kit for selectively and economically utilizing a set of linear actuator motors for one or more applications. A nut including a common form factor and mounting scheme provides easy tooling management. The structural placement of the nut associated with each of the set of linear actuator motors is intentionally located outside the mounting flange of the motor housing so that it is conveniently accessible by users to assemble and de-assemble the linear actuator. Embodiments of the invention allow attachment of the nut to either end-plate of any motor housing within the set of linear actuator motors. Certain embodiments of the present invention allow minimization of investment for experimentation by exchanging usage of the nut part regardless any length of the motor. Depending upon the embodiment, one or more of these benefits, as well as other benefits, may be achieved. These and other benefits will be described in more detail throughout the present specification and more particularly below in conjunction with the following drawings.

DETAILED DESCRIPTION OF THE INVENTION

Embodiments of the present invention are directed to applications of electromagnetically actuated devices and more particularly a method and system of selectively utilizing a set of linear actuator motors for an application. Merely by way of example, the invention has been applied to techniques related to reduce tooling investment with flexible assembly means for meeting customer's equipments. But it would be recognized that the invention has a much broader range of applicability.

Figure 1:
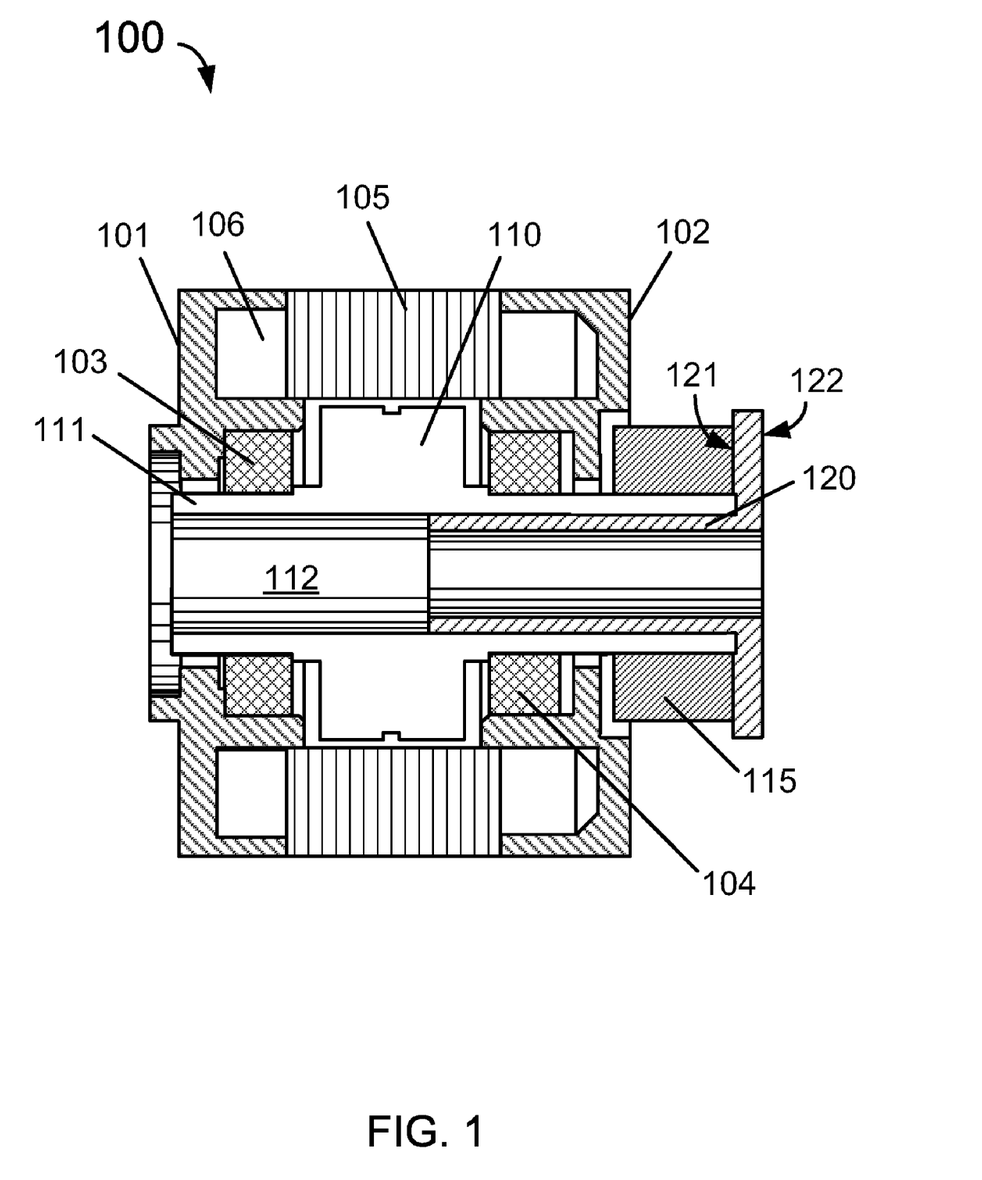
FIG. 1 is a cross-sectional view of a linear actuator motor according to an embodiment of the present invention.

FIG. 1 is a cross-sectional view of a linear actuator motor according to an embodiment of the present invention. This diagram is merely an example, which should not unduly limit the scope of the claims herein. One of ordinary skill in the art would recognize many variations, alternatives, and modifications. As shown, a linear actuator motor 100 includes a laminated stator 105 coupled with coils 106 to surround a rotor 110 with a permanent magnet integrally coupled to a shaft 111 which is pipe-like with a cylindrical shaped hollow interior 112. Outer surface of the shaft 111 is mechanically fixed to a pair of bearings 103 and 104 for facilitating the rotation. The stator 105, the coils 106, and the pair of bearings 103 and 104 are capped with two mounting flanges to form a complete box shaped housing for the linear actuator motor 100. One flange has a first end-plate 101 substantially level with a first end of the shaft 111 while the second end of the shaft 111 is extended out of a second end-plate 102 of the other flange by a distance. A sleeve 115 is configured to circumferentially cover the extended distance of the shaft 111. A nut 120 is configured to mate with the shaft 111 from the second end for holding and interlocking a lead screw or other form of linear actuator (not shown) to perform a controlled linear motion. As shown, the nut 120 includes a tube part having a predetermined length and diameter which is fit in a portion of hollow interior 112 of the shaft 111. In one embodiment, the predetermined length of the tube part is less than length of the shaft 111 and the diameter of the tube part is less than an inner diameter of the hollow interior 112. The nut 120 also includes a flat-end part that is integrally coupled with the tube part and is stopped by the sleeve 115 at a first ring-shaped side 121 with a second ring-shaped side 122 fully exposed. In a specific embodiment, the flat-end part is screw-mounted into the sleeve 115 from exposed second ring shaped side 122. Of course, there can be many alternatives, variations, and modifications. For example, the shaft 111 may be extended a portion out of the first end-plate 101 for receiving the nut 120 which can be fixedly coupled with the sleeve 115 surrounding the extended portion of the shaft 111 outside the first end-plate 101.

In one embodiment, the nut used above is configured to be able to mate in a common manner to any of a plurality of linear actuator motors. In one example, the structural shape and dimension of the nut is made standard together with the hollow shaft so that a same nut can be fit in a plurality of linear actuator motors. All of the plurality of linear actuator motors have constructed to have a hollow shaft that matches with the tube part of the nut. All those hollow shafts have longer lengths than the tube part though the respective lengths may vary for one linear actuator motor to another. Embodiments of the present invention is applicable for a variety types of linear actuator motors including, but not limited to, hybrid stepping motors, permanent magnet stepping motors, MTF hybrid motors, and PM stepping motor without ball bearings. Of course, there can be many variations, alternatives, and modifications.

In another embodiment, the shafts associated with the plurality of linear actuator motors can have a variety of design options besides a required cylindrical hollow interior. These options include, but not limited to, custom lengths, single & double shafts, D-cut shafts, threaded shafts, knurled shafts, grooved shafts, etc. In certain embodiments, the shafts are associated with either machined gears and pulleys or those sintered with powdered metal. In a specific embodiment, the mounting flanges for capping the motors can be made standard for the plurality of linear actuator motors though the interior parts may have different lengths. Typical material for making the mounting flanges includes cast aluminum and machined sheet metal. For example, MTF type sheet metal is used.

Since the mounting of the nut is executed from the second ring-shaped side 122 of the flat-end part that is fully exposed and accessible to a user, it becomes very convenient and flexible for the user to detach the nut form a shaft of one linear actuator motor and reattach it to another shaft of a different linear actuator motor. Therefore, embodiments of the present invention provides a method and system of selectively utilizing a set of linear actuator motors for a certain application.

Figure 2:
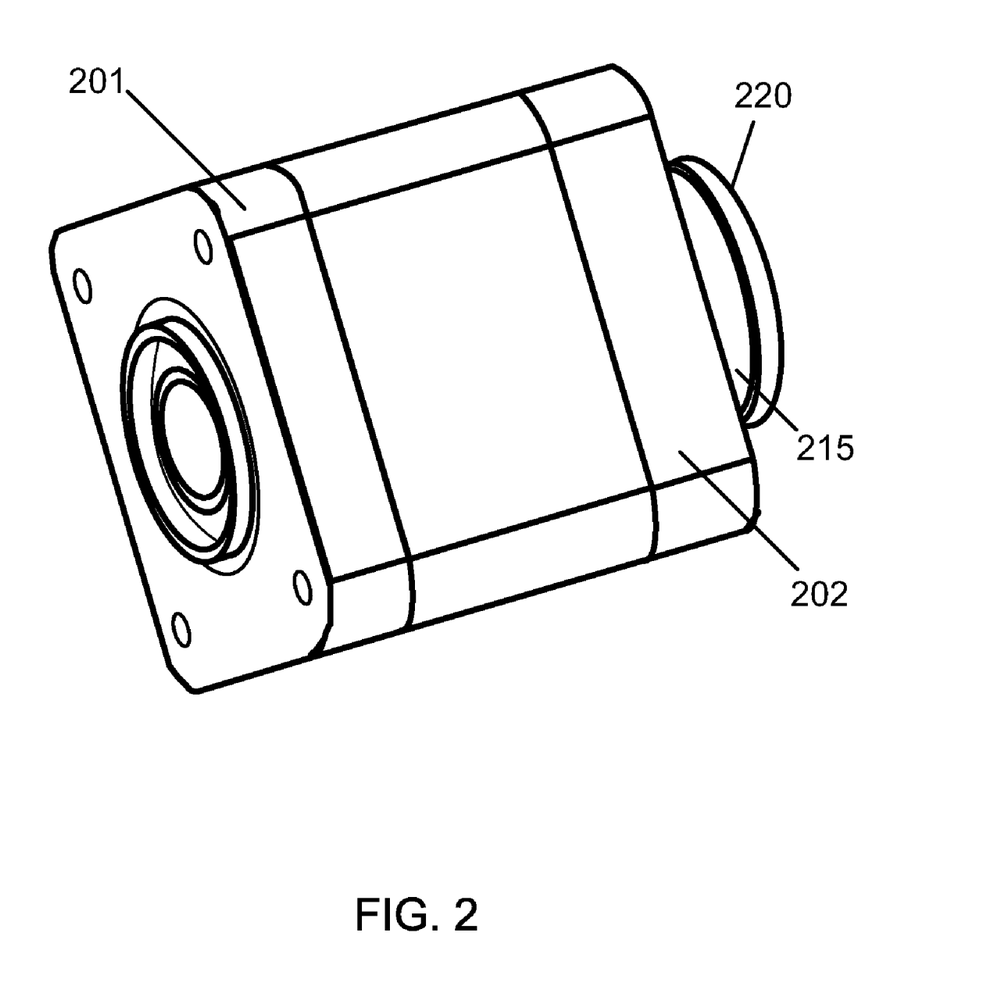
FIG. 2 is an isometric drawing of a linear actuator motor with a box shaped housing according to an embodiment of the present invention.

In particular, as a kit for the application involving controlled linear motion driven by rotary motor, the set of linear actuator motors is provided including at least a first linear actuator motor, a second linear actuator motor, and an Nth linear actuator motor, where the number N is integer greater than 2. The set of linear actuator motors each has a box shaped housing capped by two mounting flanges. As an example, FIG. 2 shows an isometric drawing of one linear actuator motor with such a box shaped housing capped by a first flange 201 and a second flange 202 according to an embodiment of the present invention. A nut 220 is attached to a sleeve 215 located around a shaft (not seen) outside the second flange 202. This diagram is merely an example, which should not unduly limit the scope of the claims herein. One of ordinary skill in the art would recognize many variations, alternatives, and modifications in terms of relative length scale and body shape, mounting screw location, and the nut structure.

Figure 3:
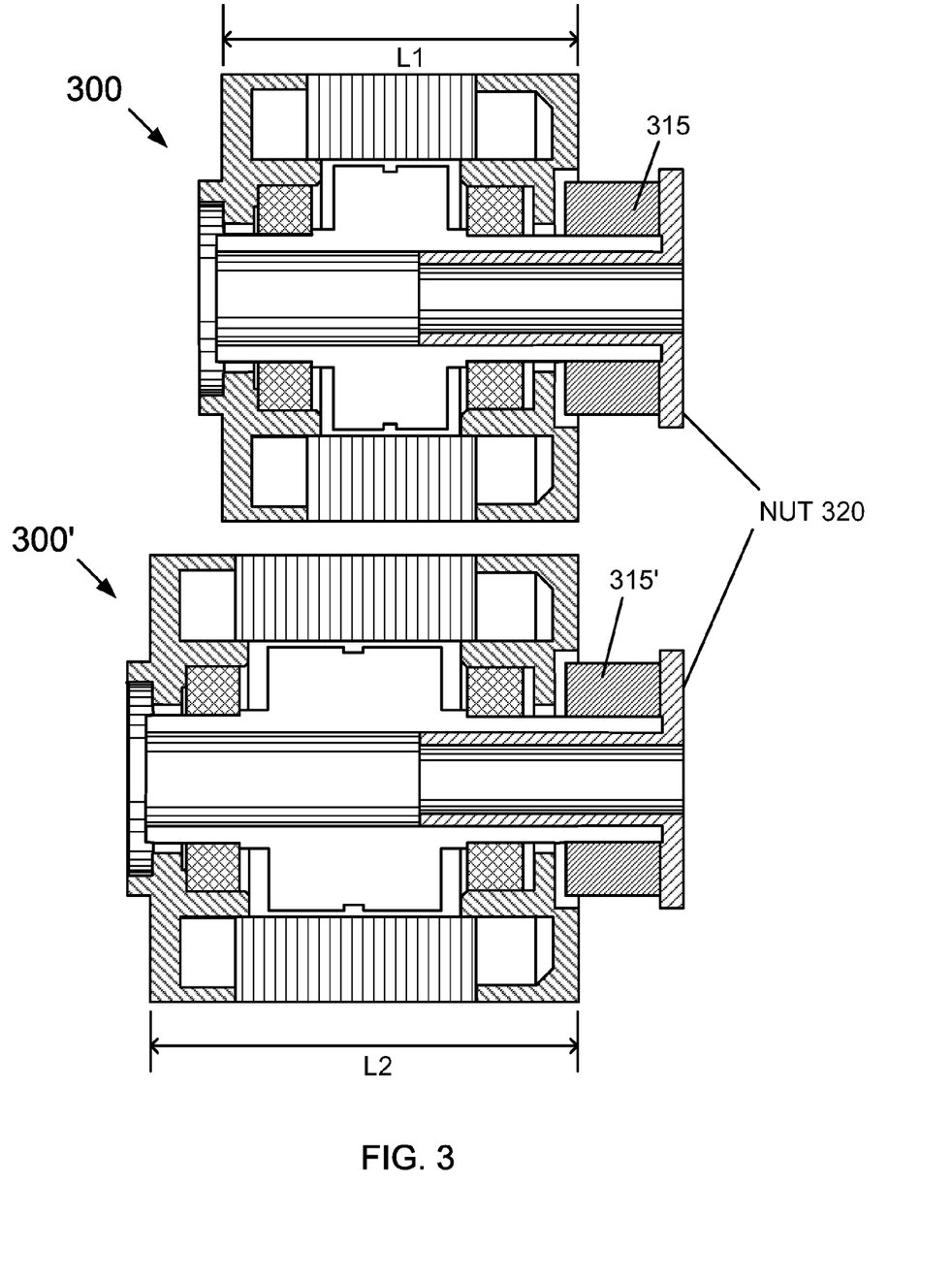
FIG. 3 is cross-sectional view of two linear actuator motors with different axial length but with a common nut according to an embodiment of the present invention.

In a preferred embodiment, the set of linear actuator motors each has substantially standard lateral dimension but vary in the axial length from a first end-plate of the first flange to a second end-plate of the second flange. In a specific embodiment, the set of linear actuator motors numbered from 1 to N are associated with respective axial lengths numbered from 1 to M, where M is integer larger than 2 and smaller than N. As an example, FIG. 3 is cross-sectional view of two linear actuator motors with different axial length according to an embodiment of the present invention. This diagram is merely an example, which should not unduly limit the scope of the claims herein. One of ordinary skill in the art would recognize many variations, alternatives, and modifications. As shown, a length L1 of the housing for the first linear actuator motor 300 is defined as a distance between the first end-plate (of the first flange) and the second end-plate (of the second flange). A length L2 of the housing for the second linear actuator motor 300' is also defined the same way. L2 is longer than L1. Correspondingly, the second linear actuator motor 300' has a longer hollow shaft than the first linear actuator motor 300. For example, the set of linear actuator motors numbered from 1 to N can have their respective axial lengths selected from, but not limited to, 30 mm, 34 mm, 36 mm, 38 mm, 42 mm, and 46 mm.

In one embodiment, the set of linear actuator motors have no other structural differences other than their respective axial lengths which are associated with different power ratings of each linear actuator motor. Correspondingly different axial length leads to different length for respective shaft in each linear actuator motor. For example, the set of linear actuator motors is associated with respective shafts numbered from 1 to M with respective lengths from a first end and a second end. But each shaft is configured to mate with a same nut. As shown in FIG. 3, either the first linear actuator motor 300 and the second linear actuator motor 300' has a shaft with substantially the same hollow interior capable of receiving a same nut 320. In another embodiment, the nut 320 is configured to be mated in a common manner with the hollow shaft of any of the set of linear actuator motors. For example, three mounting screws are used to attach the nut 320 with a sleeve 315 of the first linear actuator motor 300. The same type of three screws can be used to attach the nut 320 with a sleeve 315' of the second linear actuator motor 300'. The sleeve 315 and 315' can be the same with a length about 10 mm, and they can be different from the each other in length.

Figure 4A:
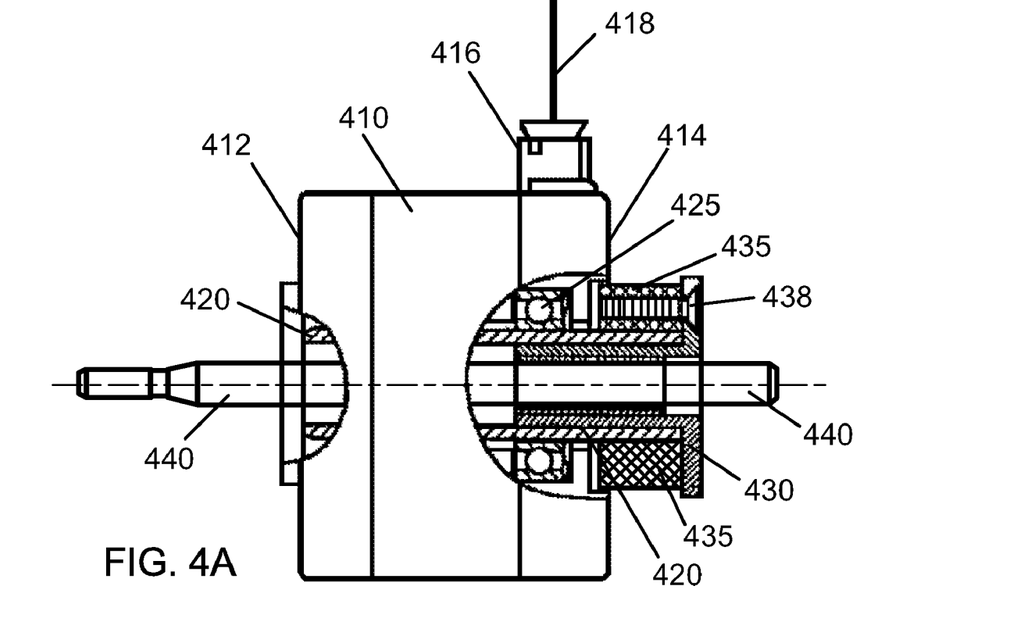
FIG. 4A is a detailed side view of an assembled linear actuator motor according to an embodiment of the present invention.

The nut mating with the shaft is intended for holding and interlocking a lead screw to generate a linear motion driven by the rotation of the shaft (originated from a rotor associated with any rotary stepping motor). FIG. 4A is a detailed side view of an assembled linear actuator motor according to an embodiment of the present invention. This diagram is merely an example, which should not unduly limit the scope of the claims herein. One of ordinary skill in the art would recognize many variations, alternatives, and modifications. As shown, the assembled linear actuator motor includes a box shaped housing 410 bounded between two end-plates 412 and 414. Partial cutoffs of the housing show details cross-sectional views of inner structures near two regions.

A first region around the first end-plate 412 near the axis shows a small portion of the hollow shaft 420 near its first end substantially level with the first end-plate 412. A portion of lead screw 440 is also shown. As seen, the lead screw 440 is inside the hollow interior and clear from the shaft by a certain space. A second region around the second end-plate 414 shows more elements such as other portion of the hollow shaft 420, ball bearings 425 that coupled to the shaft 420. The shaft 420 is extended out of the second end-plate 414 where a sleeve 435 is disposed to closely surround the portion of the shaft 420 outside the second end-plate 414. A nut 430 including a tube part integrally coupled with a flat-end part is attached with the shaft in such a way the tube part being inserted into the hollow shaft 420 while the flat-end part being stopped by the sleeve 435. Additionally, one or more screws 438 are used to mount the flat-end part with the sleeve 435 from outer face of the flat-end part. The flat-end part actually has a ring-like shape with the same inner diameter as the tube part. As seen, another portion of the lead screw 440 is held by the nut 430 within the tube part passing through the ring-like flat-end part. In fact the lead screw 440 is interlocked by the nut 430 (though the locking mechanism is not directly shown) as part of the linear actuator. Again, it is an obvious variation for the detachable nut structure including the nut 430, sleeve 435, and mounting screw 438 to be installed with the first end-plate 412 instead of the second end-plate 414.

In a specific embodiment, the nut 430 is standardized to have a fixed tube part length and respective diameters for locking lead screw 440 and mating with any hollow shaft 420 of a set of linear actuator motors. Additionally, the nut 430 is configured to have substantially the same mounting mechanism to be attached with sleeve 435 belong to any of the set of linear actuator motors, though various types of mounting mechanisms can be selected. In another specific embodiment, the nut is made of materials preferably with combustion property so that it can stay being tough with multiple operations of detaching and attaching without impact the accuracy of the linear actuator. For example, the nut material should possess a density of 1.1 or higher, a tensile strength of 66 MPa or higher, a 19% tensile elongation at break, a compressive strength of 75 MPa or higher, a flexural strength of 92 MPa or higher, sustainable to an Izod notched impact of at least 39 J/m., a Rockwell hardness of at least 110 in R scale, and coefficient of linear thermal expansion equal to or less than $9.0 \times 10^{-5}/°C$. The continuous serviceable temperature of the nut can be as high as 110° C. Of course, there can be many variations, alternatives, and modifications. The data shown above are simply representative data. The test and evaluation methods should follow ASTM and UL standards.

Figure 4B:
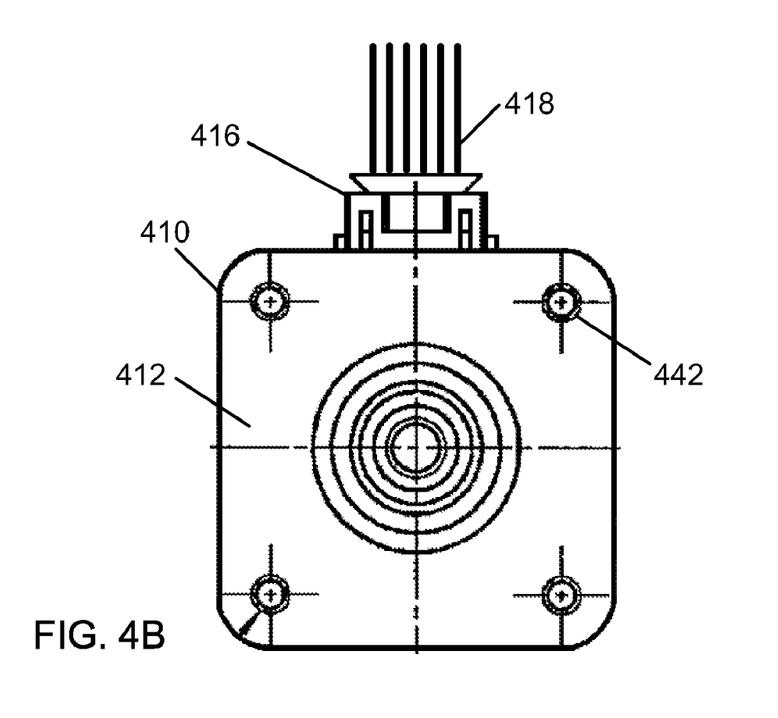
FIG. 4B is a top view in axial direction of the assembled linear actuator motor shown in FIG. 4A.

FIG. 4A also shows a side view of an electric side connector 416 disposed at top side region. Because of the view angle, only one of lead wires 418 is seen. FIG. 4B shows the same assembled linear actuator motor in axial direction from top of the first end-plate 412. Here multiple rings around the center of the housing 410 which is a substantially square shape with rounded corners. Those rings include end structures of the lead screw 440, tube part of the nut 430, first end of the shaft 420, and a circular ridge on the first end-plate 412. Additionally, four mounting screws 442 are seen to fix the first end-plate with rest portion of the housing 410. For example, four M3×0.5 type screws are used. The top side reveal another side view of same electric side connector 416 where six pins or lead wires 418 are seen. In one embodiment, the electric side connector 416 is a PCB connector. In another embodiment, the electric connector can be replaced with a bunch of direct lead wires connected to coils within the housing.

Figure 5A:
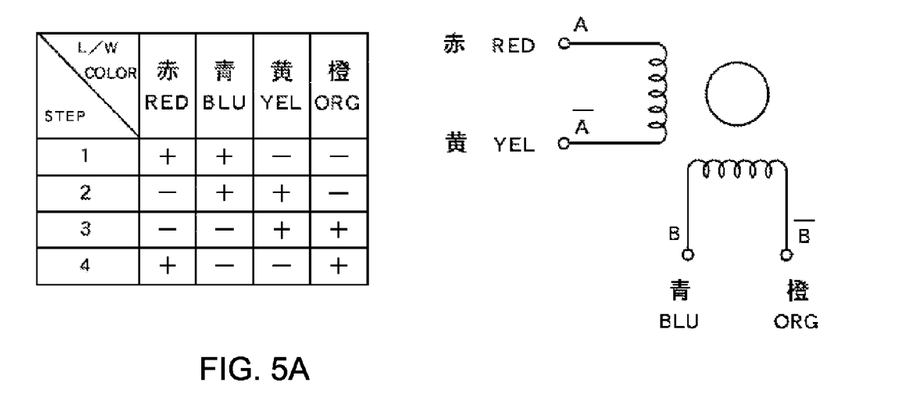
FIGS. 5A and 5B are schematic views of respective electrical control pin configurations and associated digital control sequences according to an embodiment of the present invention.

In one embodiment, the system for selectively utilizing the set of linear actuator motors further includes a controller capable of generating various digital electrical pulses. For example, the controller is a digital signal generator and is coupled with a computer that has be loaded with a pre-programmed control software. The digital controller can have a mating electric connector on its circuit board that can be directly connected to the electric side connector of each of linear actuator motor. FIG. 5A is a schematic view of respective electrical winding diagram and associated bipolar digital switching sequence according to an embodiment of the present invention. This diagram is merely an example, which should not unduly limit the scope of the claims herein. One of ordinary skill in the art would recognize many variations, alternatives, and modifications. As shown, for bipolar control at least 4 ports are used. For example, pin 1 is an input port for receiving a first digital pulse with a negative polarity and correspondingly pin 3 is an input port for receiving the first digital pulse with a positive polarity. Respectively pin 6 and 4 are input ports for receiving a second digital pulse with + and − polarity. The table shown in FIG. 5A provides multiple steps of a CW rotation using respective digital switching sequences to generate desired stepping motion with a proper torque-speed relationship in a certain range and drive a corresponding linear motion by the linear actuator.

Figure 5B:
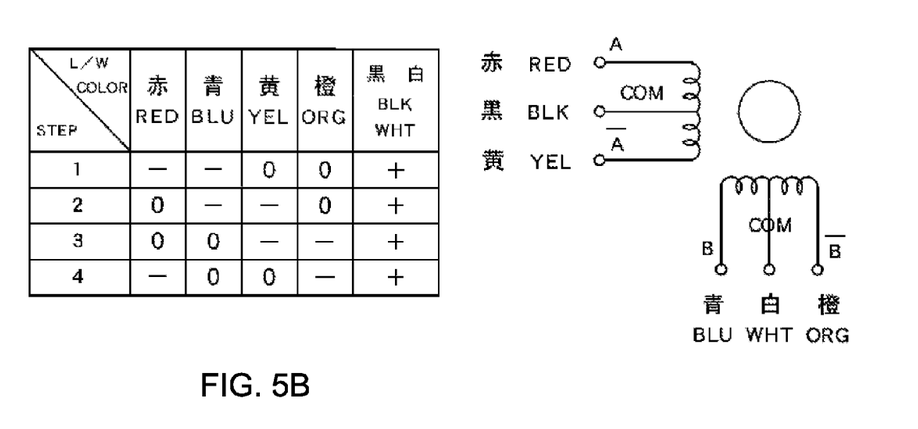

Alternatively, FIG. 5B is a schematic view of respective electrical winding diagram and associated unipolar digital switching sequence according to another embodiment of the present invention. This diagram is merely an example, which should not unduly limit the scope of the claims herein. One of ordinary skill in the art would recognize many variations, alternatives, and modifications. As shown, for unipolar control at least 6 ports are used. For example, pin 1 is an input port for receiving a first digital pulse with a negative polarity and correspondingly pin 3 is an input port for receiving the first digital pulse with a positive polarity. Respectively pin 6 and 4 are input ports for receiving a second digital pulse with + and − polarity. Additionally, pin 2 and 5 are two common ports, respectively. The table shown in FIG. 5B provides multiple steps of a CW rotation using respective digital switching sequences to generate desired stepping motion with a proper torque-speed relationship in a certain range and drive a corresponding linear motion by the linear actuator.

In another embodiment, the system for selectively utilizing the set of linear actuator motors further includes a testing device for evaluating each of the set of linear actuator motor with the nut being commonly used. In one embodiment, the testing device is coupled to the controller for receiving input signals and output a variety of test results to the computer. In another embodiment, the testing device is configured to adapt to different lengths of the set of linear actuator motors. For example, a first linear actuator motor with a linear actuator locked by the nut is under a test. The corresponding electric parameters, distance/step-accuracy parameters, speed/resolution parameters, and torque/inertia parameters will be recorded and saved into the computer. In particular, a correlation between speed and torque for given motor and driver will be subject to careful examination for a full characterization of the motor. Then a decision on whether the first linear actuator motor under testing is suit for a specific application can be made. If not, the nut can be detached from the first linear actuator motor and reattached with a second linear actuator motor. The test for the second linear actuator motor then will be performed. Such test can go on for a set of linear actuator motors until a suitable motor is selected. For certain applications, a combination of custom experimental setup, flexible tooling and economic investing makes the embodiments of the present invention very desirable and useful.

Inherently, embodiments of the present invention described throughout the specification and particularly above also provides a method of selectively utilizing a set of linear actuator motors for an application. The method includes providing a plurality of linear actuator motors including at least a first linear actuator motor, a second linear actuator motor, and an Nth linear actuator motor, where N is an integer greater than 2. The plurality of linear actuator motors numbered from 1 to N includes a box shaped housing with respective lengths numbered from 1 to M between a first end-plate and a second end-plate and respective hollow shafts numbered from 1 to M associated with respective power ratings, where M is an integer equal to or less than N. Each of the respective hollow shafts numbered from 1 to M includes an extended portion out of either the first end-plate or the second end-plate and configured to receive a nut. The nut includes a tube part integrally connected with a flat-end part. The tube part is configured to fit inside each hollow shaft for holding a linear actuator. The flat-end part is exposed and attached with a sleeve surrounding the extended portion of each hollow shaft. In one embodiment, the nut is configured to be able to mate in a common manner to any of the plurality of linear actuator motors. Additionally, the method includes testing the first linear actuator motor including the nut for the application and determining whether the first linear actuator motor with a first power rating is suitable for the application. Moreover, the method includes detaching the nut from the first linear actuator motor if the first power rating is not suitable for the application. Furthermore, the method includes reattaching the nut with a second linear actuator motor and testing the second linear actuator motor for the application.

In a specific embodiment, the method further includes determining whether the second linear actuator motor with a second power rating is suit for the application and detaching the nut from the second linear actuator motor if the second power rating is not suit for the application. The method further includes reattaching the nut with the Nth linear actuator motor, where N is an integer greater than 2, to repeat testing until that one of the plurality of linear actuator motors is selected for the application.

It is also understood that the examples and embodiments described herein are for illustrative purposes only and that various modifications or changes in light thereof will be suggested to persons skilled in the art and are to be included within the spirit and purview of

What is claimed is:

1. A method of selectively utilizing a set of linear actuator motors for an application, the method comprising:

providing a plurality of linear actuator motors including at least a first linear actuator motor, a second linear actuator motor, and an Nth linear actuator motor, where N is an integer greater than 2, the plurality of linear actuator motors numbered from 1 to N including a box shaped housing with respective lengths numbered from 1 to M between a first end-plate and a second end-plate and respective hollow shafts numbered from 1 to M associated with respective power ratings, where M is an integer equal to or less than N, each of the respective hollow shafts numbered from 1 to M including an extended portion out of either the first end-plate or the second end-plate and configured to receive a nut, the nut including a tube part integrally connected with a flat-end part, the tube part being configured to fit inside each hollow shaft for holding a linear actuator, the flat-end part being exposed and attached with a sleeve surrounding the extended portion, the nut being configured to be able to mate in a common manner to any of the plurality of linear actuator motors;

testing the first linear actuator motor including the nut for the application;

determining whether the first linear actuator motor with a first power rating is suitable for the application;

detaching the nut from the first linear actuator motor if the first power rating is not suitable for the application;

reattaching the nut with a second linear actuator motor; and testing the second linear actuator motor for the application.

2. The method of claim 1 wherein the plurality of linear actuator motors numbered from 1 to N each comprises respective rotary stepping motors.

3. The method of claim 2 wherein the respective rotary stepping motors each comprises an electrical side connector disposed at one side region of the box shaped housing.

4. The method of claim 2 wherein the electric side connector comprises a PCB connector with at least 4 pins for a bipolar drive sequence controlled by digital electric pulses.

5. The method of claim 2 wherein the electric side connector comprises a PCB connector with at least 6 pins for a unipolar drive sequence controlled by digital electric pulses.

6. The method of claim 1 wherein testing the first linear actuator motor comprises controlling rotary motion of a hollow shaft of the first linear actuator motor to drive a linear motion of a linear actuator in axial direction, the hollow shaft being mated with the nut and the linear actuator being interlocked by the nut.

7. The method of claim 1 wherein determining whether the first linear actuator motor with a first power rating is suit for the application comprises evaluating a range of holding torques associated with the first linear actuator motor is suit for the application.

8. The method of claim 1 wherein one of the plurality of linear actuator motors numbered from 1 to N comprises a power rating character defined by a holding torque value selected from a range from 20 mNm to 400 mNm.

9. The method of claim 1 wherein one the respective lengths numbered from 1 to M between a first end-plate and a second end-plate comprise a value selected from 30 mm, 34 mm, 36 mm, 38 mm, 42 mm, and 46 mm or any value in between.

10. The method of claim 1 wherein one of the respective hollow shafts numbered from 1 to M comprises a rotation character associated with ball bearings.

11. The method of claim 1 wherein the linear actuator comprises a lead screw interlocked with the tube part of the nut.

12. The method of claim 11 wherein the tube part of the nut has a predetermined length that is less than length of any respective hollow shafts numbered from 1 to M.

13. The method of claim 11 wherein the lead screw comprises a fixed step angle of about 0.9 degrees, or 1.8 degrees, or 3.75 degrees, or 5 degrees.

14. The method of claim 1 wherein detaching the nut from the first linear actuator motor comprises unscrewing the exposed flat-end part from the sleeve and removing the nut including the tube part from the hollow shaft.

15. The method of claim 1, and further comprising determining whether the second linear actuator motor with a second power rating is suit for the application;

detaching the nut from the second linear actuator motor if the second power rating is not suit for the application; and reattaching the nut with the Nth linear actuator motor, where N is an integer greater than 2, to repeat testing until that one of the plurality of linear actuator motors is selected for the application.

16. A system for selectively utilizing a set of linear actuator motors for an application, the system comprising a plurality of linear actuator motors numbered from 1 to N, where N is an integer equal to or greater than 2, the plurality of linear actuator motors numbered from 1 to N including a box shaped housing with respective lengths numbered from 1 to M between a first end-plate and a second end-plate and respective hollow shafts numbered from 1 to M associated with respective power ratings, where M is an integer equal to or less than N, each of the respective hollow shafts numbered from 1 to M including an extended portion out of either the first end-plate or the second end-plate and configured to receive a nut, the nut including a tube part integrally connected with a flat-end part, the tube part being configured to fit inside each hollow shaft for holding a linear actuator, the flat-end part being exposed and attached with a sleeve surrounding the extended portion, the nut being configured to be able to mate in a common manner to any of the plurality of linear actuator motors;

a digital controller for generating digital electric pulses; and a testing device coupled to the digital controller and configured to operate the plurality of linear actuator motors one by one for generating respective linear motions by the linear actuator interlocked by the nut, wherein the nut is detachable and reusable for any of the plurality of linear actuator motors until one of the plurality of linear actuator motors is selected for the application.

17. The apparatus of claim 16 wherein the plurality of linear actuator motors are substantially similar in structure excepting respective lengths numbered from 1 to M between the first end-plate and the second end-plate and respective hollow shafts numbered from 1 to M including the extended portion.

18. The apparatus of claim 16 wherein each of the plurality of linear actuator motors comprises an electric side connector mated with the testing device for receiving digital electric pulses from the controller to drive stepped rotary motion, wherein the electric side connector includes a PCB connector with four lead wires or six lead wires.

19. The apparatus of claim 16 wherein the nut configured to be able to mate in a common manner to any of the plurality of linear actuator motors comprises a predetermined length and diameters for the tube part and a predetermined mounting mechanism for the flat-end part to be attached with the sleeve.

20. The apparatus of claim 19 wherein the predetermined length of the tube part is less than any of respective hollow shafts and the diameter is smaller than inner diameter of any of respective hollow shafts.

* * * * *